United States Patent [19]

Knoop

[11] Patent Number: 4,664,859
[45] Date of Patent: May 12, 1987

[54] PROCESS FOR SOLVENT CASTING A FILM

[75] Inventor: Henry E. Knoop, Howell, Mich.

[73] Assignee: VCF Films Inc. Div. of PMC, Howell, Mich.

[21] Appl. No.: 817,842

[22] Filed: Jan. 10, 1986

Related U.S. Application Data

[62] Division of Ser. No. 557,448, Dec. 2, 1983, Pat. No. 4,584,231.

[51] Int. Cl.$^4$ ............................................. B29C 41/28
[52] U.S. Cl. ................................... 264/102; 264/169; 264/171; 264/204; 264/300; 264/331.18; 264/331.21; 264/338; 264/345
[58] Field of Search ............... 264/102, 166, 171, 300, 264/331.18, 331.21, 338, 345, 204, 169

[56] References Cited

U.S. PATENT DOCUMENTS

| | | | |
|---|---|---|---|
| 2,288,315 | 6/1942 | D'Alelio | 264/331.18 |
| 2,912,418 | 11/1959 | Johnson et al. | 264/236 |
| 3,050,785 | 8/1962 | Cunningham | 264/73 |
| 3,142,715 | 7/1964 | Burk | 264/213 |
| 3,663,493 | 5/1972 | Miller | 264/73 |
| 3,944,637 | 3/1976 | Bond et al. | 264/300 |
| 3,978,178 | 8/1976 | Oshima et al. | 264/166 |
| 4,146,696 | 3/1979 | Bond et al. | 264/2.3 |
| 4,183,991 | 1/1980 | Smiley et al. | 264/73 |
| 4,415,509 | 11/1983 | Toyooka et al. | 264/331.18 |
| 4,473,673 | 9/1984 | Williams et al. | 264/102 |

Primary Examiner—Jeffery Thurlow
Attorney, Agent, or Firm—Bacon & Thomas

[57] ABSTRACT

A process for solvent casting acrylic films having superior properties by casting a solution comprising an organic solvent and a polymer system of one or more acrylic polymers onto a carrier, removing the solvent thereby forming the film on the carrier, and stripping the film from the carrier, is disclosed.

The polymer system comprises at least one polymer having the following properties: Total Elongation (%) of about 120-250; Tear Resistance of about 4.5-12.5 g/mil (which is about 177-492 mg/micron); Tensile Strength of about 4500-5000 lbs/in$^2$ (about 317-387 kg/cm$^2$); Molecular Weight (amu) of about 250,000-500,000; Acid Content (%) of about 0.05-5.0; and Tucon hardness (Knoop No.) of about 6-12.

The acrylic film has Total Elongation, Tensile Strength, Tear Resistance, Acid Content and Tucon hardness in the aforesaid ranges, and is substantially free of reactive groups, such as hydroxy groups. The residual solvent in the film is (weight %) about 0-3. The film has dimensional stability (% shrinkage at about 130° C. for films of 0.5–5.0 mils, which is about 13-127 microns) of about 0.3. The thickness of the films is generally about 0.5-5.0 mils (which is about 13-127 microns). The films have excellent flexibility and extensibility, are completely free of pinholes, gels and imperfections, and have excellent weatherability.

20 Claims, 1 Drawing Figure

PROCESS FOR SOLVENT CASTING A FILM

This application is a divisional of application Ser. No. 06/557,448 filed Dec. 2, 1983, now U.S. Pat. No. 4,584,231 dated Apr. 22, 1986.

BACKGROUND OF THE INVENTION

1. Field of the Invention

The invention relates to solvent casting, which consists of dissolving one or more synthetic resins in an organic solvent, casting the solution onto a suitable substrate, removing the solvent whereby a film is formed on the carrier, and stripping the film from the carrier. Normally the film is wound into rolls.

2. Description of the Prior Art

Solution-cast polymeric films have been used for decades. The most familiar of them are the high quality films used in photographic films. Cellulose ester photographic film base is best known for its dimensional stability and high clarity.

There are many other processes for the formation of films. Calendering, extrusion, plastisol cast systems, and organosol cast systems are the most common. However, solvent casting is the only method that can provide a film which has excellent dimensional stability as well as freedom from pinholes, gels and imperfections. Due to the very low heat history which is inherent in the solvent casting processing, it provides an extended service life to the film.

The solution cast process offers several unique features which conventional fusion processes lack. Extrusion and calendering are processes which melt the polymer and shape the plastic prior to freezing. Plastisol and organosol casting processes involve the melting of the polymer in a plasticizer matrix, after which the solvent action of the plasticizer forms a film. In solvent casting, film formation depends upon solubility, not melting. Thus, a wide range of polymeric alloys can be produced by solvent casting. Because the flowability to form a film is provided by the solvent, a pure resin can be manufactured without adulteration by heat, stabilizers, plasticizers or lubricants. Only additives which are beneficial to the finished product need to be incorporated with the polymer.

There are disadvantages to solvent casting when compared to other film-forming methods, such as extrusion. Solvent casting obviously requires a solvent, which is in most cases quite expensive. This necessitates a complex solvent vapor recovery and rehabilitation system. Moreover, exposure of personnel to certain solvents is undesirable, and this requires a system that is closed to the atmosphere, especially when temperatures above the boiling point of the solvent are used.

Attempts have been made to solvent cast acrylic films without the use of additives or release coatings applied to the casting substrate. However, these attempts have heretofore been unsuccessful because the films produced were not strippable: the films adhered to the substrate or carrier after the removal of the solvent. Accordingly, the prior art regards acrylic films as not suitable for solvent casting. Current acrylic films are produced primarily by extrusion with its inherent disadvantages. The superior properties of the present films cannot be duplicated in films prepared by other methods, such as extrusion.

SUMMARY OF THE INVENTION

It has been unexpectedly discovered that solvent cast acrylic films can be produced provided that the polymers used to produce the films are restricted to a unique group of acrylic polymers hereinafter described as the polymer system. The films thus produced can easily be stripped from the substrate or carrier.

The acrylic films of the present invention have superior properties. They are free of gels and imperfections, including pinholes. The films of the present invention have excellent dimensional stability and excellent gauge uniformity. They possess high clarity and high gloss, and resist ultraviolet light transmission. These films can be printed and metalized. They can also be laminated to other plastics or substrates (including metals, woods, papers, foils and glass) by means of heat or adhesives. The resulting surfaced substrates show excellent exterior weatherability.

The acrylic films of the present invention are produced by a solvent casting method. A polymer system and a suitable organic solvent are mixed to form a solution. The solution is cast onto a substrate. The solvent is removed thereby leaving the film on the substrate. The film is then stripped from the substrate.

The polymer system comprises at least one polymer prepared by polymerizing monomers of the general formula (I):

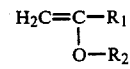

wherein: $R_1$ is hydrogen or methyl; and $R_2$ is straight or branched alkyl of about 1–20 carbon atoms, preferably about 1–8 carbon atoms, more preferably 1–4 carbon atoms, and most preferably 1–2 carbon atoms.

The polymers are homopolymers, mixed copolymers, and graft copolymers. They may be cross-linked.

The polymers have the following properties:

Total Elongation (%) of about 120–250, preferably about 150–210, and more preferably about 170–190;

Tear Resistance of about 4.5–12.5 g/mil (which is about 177–492 mg/micron), preferably 6–10 g/mil (which is about 236–394 mg/micron), and more preferably about 8–9 g/mil (which is about 315–354 mg/micron);

Tensile Strength of about 4500–5000 lbs/in$^2$ (about 317–387 kg/cm$^2$), preferably about 4800–5200 lbs/in$^2$ (about 338–366 kg/cm$^2$), and more preferably about 4900–5100 lbs/in$^2$ (about 345–359 kg/cm$^2$);

Molecular Weight (amu) of about 250,000–500,000, preferably about 300,000–400,000, and more preferably about 325,000–375,000;

Acid Content (%) of about 0.5–5.0, preferably about 0.0–2.0, and more preferably about 0.0–0.9;

Tucon hardness (Knoop No.) of about 6–12, preferably of about 7–11, and more preferably of about 8–10; and The polymer is substantially free of reactive groups, such as hydroxy groups.

The acrylic film has Total Elongation, Tensile Strength, Tear Resistance, Acid Content and Tucon hardness in the aforesaid ranges, and is substantially free of reactive groups, such as hydroxy groups. The residual solvent in the film is (weight %) about 0–3, preferably about 0–2, and more preferably about 0.1–1.0. The film has dimensional stability (% shrinkage at about 130° C. for films of 0.5-5.0 mils, which is about 13-127 microns) of about 0-3, preferably of about 0-2, and more preferably of about 0.1-1.0. The thickness of the films is generally about 0.5-5.0 mils (which is about 13-127 microns), preferably about 0.75-3.0 mils (about 19-76 microns), and more preferably about 1.0-2.5 mils (which is about 25-63 microns). The films have excellent flexibility and extensibility. They are completely free of pinholes, gels and imperfections. The films have excellent weatherability.

Unless the contrary is expressly noted, any reference to a polymer in this description also includes a mixture of polymers having the same properties and produced from the same group of monomers as the polymer, provided that all polymers of the mixture are substantially miscible in each other in the solvent.

DETAILED DESCRIPTION OF THE INVENTION

Figure 1:
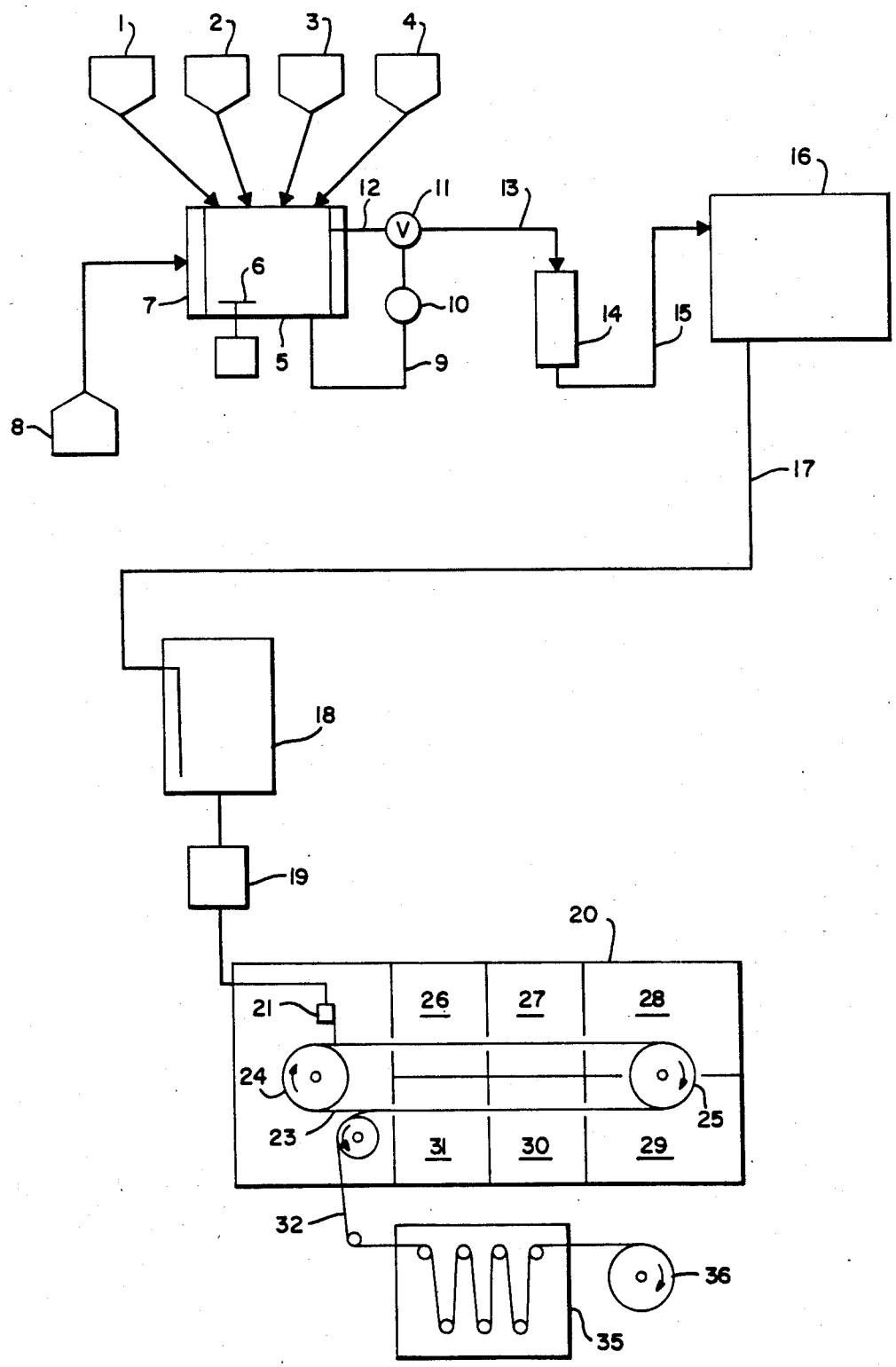

In the present invention the resin to be cast is a polymer system. The polymer system may comprise a single polymer, or a plurality of polymers.

The polymers are prepared by polymerizing monomers of the general formula (I), more fully described above in the Summary of the Invention. Processes of polymerization are well known to the art. In this regard, the disclosures of the following U.S. Patents are hereby incorporated by reference, U.S. Pat. Nos. 2,992,203; 3,454,516; 3,502,604; 3,804,925; 4,052,525; and 4,173,600.

The polymers used to form the films of the present invention are prepared by polymerizing alkyl acrylates and alkyl methacrylates (with reference to formula (I), $R_1$ is hydrogen and methyl, respectively). Preferred monomers include: alkyl acrylates such as methyl acrylate, ethyl acrylate, propyl acrylate, butyl acrylate, isobutyl acrylate, lauryl acrylate, and 2-ethylhexylacrylate; and alkyl methacrylates such as methyl methacrylate, ethyl methacrylate, propyl methacrylate, butyl methacrylate, isobutyl methacrylate, lauryl methacrylate, and 2-ethylhexylmethacrylate.

In a first embodiment of the present invention, the polymer system comprises a graft copolymer prepared by polymerizing monomers of the general formula (I), as more fully described in the summary of the invention. It is preferred that each section of the graft copolymer be comprised of monomers of at least one alkyl acrylate and monomers of at least one alkyl methacrylate. It is preferred that the sections of the graft copolymer each be comprised of the same alkyl acrylate and alkyl methacrylate monomers, but that the sections differ in the relative amounts of these monomers.

In a second embodiment of the present invention, the polymer system comprises a graft copolymer of three sections: section (A), which is about 5-35%, preferably 25-30%, of the polymer by weight (all subsequent % compositions are by weight, unless the contrary is expressly noted), and is comprised of about 80-100%, preferably about 90-100% of an alkyl (of 1-8 carbons) acrylate monomer or monomers, and about 0-20%, preferably about 0-10%, of an alkyl (of 1-12 carbons) methacrylate monomer or monomers, and may be crosslinked; section (B), which is about 1-70%, preferably about 5-50%, of the polymer, and is comprised of about 10-60%, preferably about 20-60%, of an alkyl (of 1-8 carbons) acrylate monomer or monomers, and about 40-90%, preferably about 40-80%, of an alkyl (of 1-4 carbons) methacrylate monomer or monomers, and about 0-20% of an alkyl (1-12 carbons) methacrylate monomer or monomers; and Section (C), which is the remainder of the polymer, and is comprised of about 60-100%, preferably about 85-100%, of an alkyl (of 1-4 carbons) methacrylate monomer or monomers, and about 0-40%, preferably about 0-15%, of an alkyl (of 1-12 carbons) methacrylate monomer or monomers.

In a third embodiment of the present invention, the polymer system comprises a graft copolymer of four sections (or layers): section (A), which is about 5-35% of the polymer, and comprises about 51-100 parts by weight (all subsequent parts are by weight unless the contrary is expressly noted) of an alkyl (of 1-4 carbons) methacrylate monomer or monomers, about 0-49 parts of an alkyl (1-8 carbons) acrylate monomer or monomers, about 0-10 parts of a polyfunctional monomer, and about 0.1-5 parts of a graftlinking agent; section (B), which is about 5-45% of the polymer, and comprises about 80-120 parts of an alkyl (1-8 carbons) acrylate monomer or monomers, about 0-10 parts of a polyfunctional monomer, and about 0.1-5 parts of a graftlinking agent; section (C), which is about 5-35% of the polymer, and comprises about 10-90 parts of an alkyl (of 1-4 carbons) methacrylate monomer or monomers, about 90-100 parts of an alkyl (of 1-8 carbons) acrylate monomer or monomers, about 0-10 parts of a polyfunctional monomer, and about 0.1-5 parts of a graftlinking agent; and section (D), which is about 10-80% of the polymer, and comprises 51-100 parts of an alkyl (of 1-4 carbons) methacrylate monomer or monomers, and about 0-49 parts of an alkyl (of 1-8 carbons) acrylate monomer or monomers. Suitable graftlinking agents include allyl, methallyl, and crotyl esters of copolymerizable alpha, beta-unsaturated monocarboxylic or dicarboxylic acids; triallyl cyanurate; and triallyl isocyannurate in an amount of 0.1 to 5 parts by weight. The allyl esters include those of acrylic acid, methacrylic acid, maleic acid, fumaric acid, and itaconic acid. The preferred esters are those of acrylic acid and methacrylic acid. Of thesem allyl methacrylate is especially effective. The graftlinking agent is used in an amount of 0.1 to 5, preferably 0.5 to 2, parts by weight per 100 parts by weight of the respective section. The polyfunctional monomers are copolymerizable and include preferably ethylene glycol dimethacrylate, 1,3-butylene glycol dimethacrylate, 1,4-butylene glycol dimethacrylate, and propylene glycol dimethacrylate; divinylbenzene and alkylene glycol diacrylates. The graft copolymer may be obtained without using such a polyfunctional monomer so long as an allyl ester is present. Optionally, the graft copolymer may comprise five sections: (A); (C); (B); (C); and (D).

In a fourth embodiment of the present invention, the polymer system comprises a mixed copolymer which comprises: about 10-60%, preferably 30-50%, and more preferably 35-45% of alkyl acrylate monomers of formula (I); and about 40-90%, preferably 50-70%, and more preferably 55-65% of alkyl methacrylate monomers of formula (I). Preferably, the mixed copolymer comprises only one type of alkyl acrylate monomer of formula (I), and only one type of alkyl methacrylate monomer of formula (I). However, when the mixed copolymer comprises a plurality of types of alkyl acrylate monomers of formula (I), it is preferred that the alkyl methacrylate monomers of formula (I) comprise the same alkyl groups (to illustrate, if methyl acrylate and ethyl acrylate are the acrylate monomers, then it is preferred that methyl methacrylate and ethyl methacrylate are the methacrylate monomers).

In the fifth and most preferred embodiment of the present invention, the polymer system comprises a mixture of two mixed copolymers: about 50–99%, preferably 70–99%, more preferably 80–95%, and most preferably about 90% of Polymer A; and about 1–50%, preferably 1–30%, more preferably 5–20%, and most preferably about 10% of Polymer B. Polymers A and B are each mixed copolymers prepared by polymerizing monomers of formula (I). It is preferred that Polymers A and B have at least one monomer in common, and preferably all monomers in common. It is preferred that Polymers A and B each comprise one alkyl acrylate and one alkyl methacrylate. It is critical that polymers A and B are miscible in each other in the organic solvent used to cast the film.

Polymer A is the "soft" polymer of the polymer system and Polymer B is the "hard" polymer of the system. It is noted that acrylate monomers are generally "softer" than methacrylate monomers, and that as the number of carbons in the alkyl group increases, the "softness" of the acrylate or methacrylate increases.

Polymer A has the properties of the polymers of the present invention described in the Summary of the Invention. In contrast, Polymer B has the following properties: it is prepared by polymerizing monomers of formula (I) above; it has a Total Elongation (%) of about 3–7%; it has a Tensile Strength of about 8,000–10,000 lbs/in$^2$ (which is about 563–704 kg/cm$^2$); it has a Tear Resistance of 4–6 g/mil (which is about 157–236 mg/micron); Molecular Weight (amu) of about 90,000–120,000, and preferably about 100,000–110,000; Acid Content (%) of about 0.0–5.0, preferably about 0.0–2.0, and more preferably about 0.0–0.9%; and Tucon hardness (Knoop. No.) of about 12–22, and preferably about 15–19.

Polymer A preferably comprises: about 10–60%, more preferably about 30–50%, and most preferably about 35–45% of alkyl acrylate ($R_1$ is hydrogen) monomers of formula (I), and more preferably of a single alkyl acrylate monomer of formula (I); and about 40–90%, more preferably about 50–70%, and most preferably 55–65% of alkyl methacrylate ($R_1$ is methyl) monomers of formula (I), and more preferably of a single alkyl methacrylate monomer of formula (I).

Polymer B preferably comprises about 3–20%, and preferably about 3–10% of alkyl acrylate ($R_1$ is hydrogen) monomers of formula (I), and preferably of a single alkyl acrylate monomer of formula (I); and about 80–97%, and preferably about 90–97% of alkyl methacrylate ($R_1$ is methyl) monomers of formula (I), and preferably of a single alkyl methacrylate monomer of formula (I).

In an example of the fifth embodiment of the present invention, Polymer A had a Tensile Strength of 5,000 lbs/in$^2$ (about 352 kg/cm$^2$), a Total Elongation of 175–185%, and a Tear Strength of 8.5 g/mil (about 335 mg/micron), and Polymer B has a Tensile Strength of 9000 lbs/in$^2$ (about 634 kg/cm$^2$), a Total Elongation of 5%, and a Tear Resistance of 5 g/mil (about 197 mg/micron). The resulting film had the superior properties described in the foregoing, and an acid content of about 0.5%.

Obviously, a compatible "hard" polymer, such as Polymer B, could be mixed with any of the polymers of the present invention, including those of the first four embodiments, to form a polymer system. Such compatible "hard" polymers can be used to adjust the softness of the resulting film.

In addition, the present invention includes the incorporation of an incompatible monomer or polymer into the mixture of solvent and polymer system. For example, polyvinylchloride (PVC) in an amount up to about 20% of the weight of the polymer system can be added to the mixture of solvent and polymer system to produce a film having a matte finish.

In the foregoing, Total Elongation was measured according to procedures standard in the art. The pure polymer was solvent cast and the film slit into one inch (about 2.54 cm) strips. An Instron Tensile Testing Machine elongated the strip at about 2 inches (about 5.08 cm) per minute.

In the foregoing, Tensile Strength was measured according to ASTM D 882-67, Method B, reapproved 1970, "Tensile Properties of Thin Plastic Sheeting".

In the foregoing, Tear Resistance was measured according to ASTM D 1938-67, reapproved 1972, "Tear Propogation or Resistance to in Plastic Film and Sheeting by Single Tear Method."

FIG. 1 is a schematic representation of a preferred method and apparatus of the present invention. Storage containers 1–4 of raw materials are used to store the polymer or polymers, solvent, and additives known to the art, such as ultra-violet light (UV) absorbers.

In a preferred method of the present invention an organic solvent is placed in the mixer 5. The polymer system must be completely soluble in the solvent. Suitable solvents include: Acetone, Aniline, Dimethyl Sulfoxide (DMSO), Benzene, Dimethyl Formamide (DMF), Methyl Ethyl Ketone (MEK), Ethyl Acetate, Ethylene Dichloride, Toluene, and Tetrahydrofuran (THF). However, the solvent of preference is THF.

All components of the film are added to the solvent in the mixer 5. Mixing is a batch operation carried out in mixer 5 with agitation provided by a high shear mixing blade 6, eccentrically located in the mixer. If a clear film is desired, it is critical that a true solution of all the components be achieved.

The preferred composition of components charged to the mixer is about 25–50% solids and about 50–75% solvent. After the components have been added to the solvent, mixer 5 is closed and sealed to prevent the escape of solvent vapors. Agitation by blade 6 is begun, and steam from steam source 8 is charged to the mixer steam jacket 7. Assuming THF is used as the solvent, the mixture is preferably heated to about 190°–210° F. (88°–99° C.). As a general rule, the mixture is heated to a temperature above the boiling point of the solvent, but less than a temperature about 100° F. (38° C.) above the boiling point of the solvent. Since THF boils at 152° F. (67° C.) at atmospheric pressure, pressure builds up in mixer 5 as the temperature is increased. If the mixture is at about 200° F. (93° C.), the pressure in the mixer is about 45 lbs/in$^2$ (3.2 kg/cm$^2$). Preferably, the mixture is mixed at about 190°–210° F. (88°–99° C.) until the viscosity of the solution is about 2,000–3,000 centipoise, more preferably 2,220–2,800 centipoise, and most preferably about 2,500 centipoise. In order to measure the viscosity of the mixture, it is preferred that mixer 5 is provided pipes 9 and 12, viscosity meter 10, and three way valve 11. When three way valve is in the first open position, mixture is pumped by suitable means from the bottom of mixer 5 through pipe 9, which carries it through meter 10, through valve 11 and into pipe 12, thereby returning it to the top of mixer 5. The mixture is allowed to flow through this closed loop continuously, and the current viscosity of the mixture is read on meter 10.

When desired viscosity is reached, valve 11 is moved to the second open position, and the mixture is pumped by suitable means from the bottom of mixer 5, through pipe 9, valve 11, pipe 13, filter 14, and pipe 15 into the top of holding tank 16. This system is closed to the atmosphere to prevent the escape of solvent in the vapor or liquid state.

Filter 14 is preferably a plate frame filter to remove solution contaminants and to strain out any coarse undissolved ingredients.

It is preferred that mixer 5 not be pumped dry while in communication with holding tank 16 as this would introduce a large number of additional air or gas bubbles into the mixture. Bubbles are undesirable as they cause pinholes in the films. Once mixer 5 is substantially empty, valve 11 is closed and mixer 5 is cooled until it is ready to accept the next batch.

The mixture in holding tank 16 is isolated by closing appropriate valves (not shown). As the mixture cools to a temperature below the boiling point of the solvent, the viscosity obviously increases. Assuming the preferred solvent (THF) is being used, when the temperature of the mixture reaches about 130°-150° F. (54°-66° C.), the pressure in holding tank 16 in atmospheric pressure. At this point, bubbles in the mixture begin to surface. The mixture is allowed to sit until such time as substantially all bubbles have surfaced. In a preferred embodiment of the present invention, it requires about 2-4 hours before all bubbles have surfaced. Thus, the mixture has been degassed.

After the mixture has been degassed, it is then pumped by suitable means from the bottom of holding tank 16 (at atmospheric pressure but closed to the atmosphere) through pipe 17 and into casting tank 18. Holding tank 16 is never pumped dry as this would introduce gas bubbles into the mixture. There is always a sufficient amount of degassed mixture left in holding tank 16 so as to be absolutely certain that no bubbles enter pipe 17.

The level of degassed mixture in casting tank 18 is never allowed to drop below the terminus of pipe 17 which is closely adjacent the bottom of casting tank 18. This prevents the formation of bubbles in the mixture. If the mixture exited from pipe 17 and dropped to the surface of the remaining mixture in casting tank 18, bubbles would be formed. As stated above, bubbles in the mixture cause pinholes in the film.

Mixture from casting tank 18 is pumped by suitable means through filter 19 to die 21. Filter 19 is preferably a plate frame filter. The mixture (at a temperature below its boiling point) is deposited on the casting surface 23 by die 21. As the casting solution leaves die 21, the solution is exposed to air for the first time.

While a die 21 is illustrated, it is not critical. The spreading of the mixture on the casting surface may be done with a doctor blade, rolling spreader bar or any of several configurations of flat sheeting extrusion dies.

The casting surface (or substrate) can be an endless belt of highly polished stainless steel, copper, or silicone rubber. The casting surface may also be an endless belt of any material coated with another insoluble polymeric material or release paper. Regardless of the construction, the casting surface may be textured so as to form a matte finish, or a glossy highly polished one. Alternatively, a casting drum may be used in place of the endless belt. Laboratory tests are frequently carried out using glass or stainless steel plates as a substrate. However, plates are not suitable for continuous casting and are therefore not used in production runs.

In one preferred embodiment, casting surface 23 is a continuous stainless steel belt supported by pulleys 24 and 25, which are driven to rotate in the direction shown, thereby providing a moving casting belt 23, in bandcaster 20. The band speed is generally about 40-100 feet (12-30 m) per minute, but depends on a number of factors, such as the viscosity and temperature of the casting mixture.

Bandcaster 20 is provided with a series of heating zones 26, 27, 28, 29, and 30, at least one cooling zone 31, and a solvent vapor recovery system (not shown). Generally, the temperature in zones 26, 27, 28, 29 and 30 increases so that the film is gradually heated. This causes the solvent to vaporize, thereby removing it from the mixture on belt 23 and forming the film. However, it is critical that the temperature of the film be kept sufficiently below the boiling point of the solvent so as to prevent the formation of bubbles of solvent vapor in the film, because such bubbles would cause pinholes in the film. As the film cools, it becomes more resistant to bubble formation. The temperatures of the zones depend on a variety of factors: thickness of film; temperature of casting solution; composition of film; solvent; belt speed; and so forth. At least one zone 31 is provided to cool the film before it is stripped from the casting belt.

After the film 32 is stripped from belt 23, it may be wound directly onto a roll (not shown). Alternatively, it is dried in a festoon drier 35 and wound onto roll 36. Festoon drier 35 is provided with a plurality of rollers, an air source (not shown), a heat source (not shown), and a solvent recovery system (not shown). As the film travels over the plurality of rollers in festoon drier 35, both sides of the film are exposed to the air. This allows an increased rate of drying when compared to drying on casting belt 23, when only one side of the film is exposed to the air After the film leaves festoon drier 35, it is wound on roller 36.

In the foregoing, both English and metric units of measurement are given. Generally speaking, applicant carried out the relevant tests and experiments using English units, and then these units were converted to metric units for purposes of the present application. For example, the tear resistance was measured in g/mil, and converted to mg/micron. Accordingly, if there is a disagreement between the English and metric units, the English units take precedence.

I claim:
1. A process for producing an acrylic film comprising the steps of:
   (1) adding an organic solvent to a mixer;
   (2) adding a polymer system to said organic solvent in said mixer;
   (3) mixing said solvent and said polymer system to form a mixture that is a true solution of all components;
   (4) degassing said mixture to remove all bubbles;
   (5) casting said degassed mixture on a casting surface;
   (6) removing said organic solvent from said cast, degassed mixture on said casting surface thereby forming said acrylic film on said casting surface;
   wherein said acrylic film consists essentially of about 97-100% of said polymer system and about 0-3% of said organic solvent;

said polymer system consisting essentially of a polymer or mixture of polymers, each of said polymers consisting essentially of monomers of formula (I):

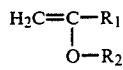

wherein $R_1$ is selected from the group consisting of hydrogen and methyl, and $R_2$ is selected from the group consisting of straight or branched alkyl groups of from 1 to 20 carbon atoms, each of said polymers having the following properties:
(a) a total elongation of about 120–250%;
(b) a tear resistance of about 4.5–12.5 g/mil (177–492 mg/micron);
(c) a tensile strength of about 4500–5000 lbs/in$^2$ (about 317–387 kg/cm$^2$);
(d) a molecular weight of about 250,000–500,000 amu;
(e) an acid content of about 0.0–5.0%;
(f) a Tucon hardness in Knoop numbers of about 6–12;
(g) being substantially free of reactive groups;

said film having each of the aforesaid properties (a) through (c) and (e) through (g), having a thickness of about 0.5–5.0 mils (13–127 microns), having dimensional stability of less than 3.0% shrinkage, being completely free of pinholes and gels.

2. The process of claim 1, wherein:
said step (3) comprises the following substeps (3.1) through (3.3):
(3.1) closing said mixer and sealing it off from the atmosphere;
(3.2) mixing said solvent and said polymer system by the action of a high shear mixing blade;
(3.3) heating the contents of said mixer while mixing to a mixing temperature in excess of the boiling point of said organic solvent;
said step (4) comprises the following substeps (4.1) through (4.3):
(4.1) removing said mixture resulting from step (3) from said mixer and filtering the same to remove contaminants and any coarse undissolved ingredients;
(4.2) adding said filtered mixture of substep (4.1) to a holding tank and allowing it to cool to a temperature below the boiling point of said organic solvent;
(4.3) allowing said cooled mixture of substep (4.2) to stand for a period of time sufficient to allow all bubbles to rise to the surface of said cooled mixture;
said mixture of said organic solvent and said polymer system not being exposed to the atmosphere from said closing of said mixer in said substep (3.1) until said casting in said step (5).

3. The process of claim 2, wherein:
the amount of said organic solvent added to said mixer in step (1) is such that said solvent is about 50–75% of all components added to said mixer,
said step (3) further comprises the following substeps (3.4) after said substep (3.3):
(3.4) continuing said mixing at said mixing temperature until the viscosity of the said contents of said mixer is about 2,000–3,000 centipose;

said step (4) further comprises the following substep (4.4) after said substep (4.3):
(4.4) removing said degassed mixture of substep (4.3) from the base of said holding tank whereby bubbles are never formed in said degassed mixture, filtering said degassed mixture to remove all contaminants and solids, and transferring said filtered degassed mixture to a casting tank whereby said filtered degassed mixture never contacts the surface of the liquid in said casting tank thereby preventing the formation of any bubbles in said filtered degassed mixture;
said step (5) comprises the following substeps (5.1) through (5.2):
(5.1) removing said filtered degassed solution of substep (4.4) from the bottom of said casting tank without every emptying said casting tank thereby preventing the formation of bubbles in said filtered degassed solution;
(5.2) spreading said filtered degassed solution onto said casting surface at a temperature sufficiently below the boiling point of said solution to prevent the formation of bubbles in the solution as it contacts the atmosphere thereby forming a cast solution on said casting surface, said casting surface being continuous and moving relative to the stationary point of said spreading;
said step (6) comprises the following substeps (6.1) through (6.4):
(6.1) moving said cast solution by means of said moving casting surface into at least one heating zone;
(6.2) as said casting surface moves through said heating zone, heating said cast solution to vaporize a substantial portion of said organic solvent, thereby forming said acrylic film on said casting surface, said heating being gradual enough so that bubbles of solvent vapor are not formed in the film;
(6.3) moving said acrylic film by means of said moving casting surface into at least one cooling zone;
(6.4) as said acrylic film moves through said cooling zone, cooling said acrylic film;
said process further comprising the following step (7) after substep (6.4):
(7) stripping said acrylic film from said casting surface.

4. The process of claim 3, wherein:
said organic solvent is selected from the group consisting of Acetone, Aniline, Dimethyl Sulfoxide (DMSO), Benzene, Dimethyl Formamide (DMF), Methyl Ethyl Ketone (MEK), Ethyl Acetate, Ethylene Dichloride, Toluene, and Tetrahydrofuran (THF);
said filtering of substep (4.1) and said filtering of substep (4.4) are both by means of a plate frame filter and both to 15 microns;
said period of time of substep (4.3) is about 2–4 hours;
said casting surface is selected from the group consisting of drums and belts of stainless steel, copper and silicon rubber, and drums and belts of any material coated with an insoluble polymeric material or release paper;
said casting surface moving relative to said stationary spreading point at a speed of about 12–30 m/min.

5. The process of claim 4, wherein said organic solvent is THF, said mixing temperature of substep (3.3) is about 190°–210° F. (about 88°–99° C.), and said viscosity of substep (3.4) is about 2,200–2,800 centipoise.

6. The process of claim 1, wherein:

said $R_2$ is selected from the group consisting essentially of straight or branched alkyl groups of from 1 to 8 carbon atoms;

said acid content (e) is about 0.0–2.0%;

said film thickness is about 0.75–3.0 mils (about 19–76 microns);

said residual organic solvent is present in an amount of about 0–2%;

and said polymer system is present in an amount of about 98–100%.

7. The process of claim 6, wherein:

said total elongation (a) is about 150–210%;

said tear resistance (b) is about 6–10 g/ml (about 236–394 mg/micron); said tensile strength (c) is about 4800–5200 lbs/in$^2$ (about 338–366 kg/cm$^2$);

said molecular weight (d) is about 300,000–400,000 amu;

said Tucon hardness (f) is about 8–10 Knoop Nos.;

said dimensional stability is about 0–2%;

said residual organic solvent is present in an amount of about 0.1–1.0%; and said polymer system is present in an amount of about 99.0–99.9%.

8. The process of claim 7, wherein:

said total elongation (a) is about 170–190%;

said tear resistance resistance (b) is about 8–9 g/mill (about 315–354 mg/micron);

said tensile strength (c) is about 4900–5100 lbs/in$^2$ (about 345–359 kg/cm$^2$);

said acid content (e) is about 0.1–0.9%;

said Tucon hardness (f) is about 8–10 Knoop Nos.;

said film thickness is about 1.0–2.5 mils (about 25–63 microns); and said dimensional stability is about 0.1–10%.

9. The process of claim 1, wherein:

said polymer system consists essentially of a first graft copolymer, said first graft copolymer consisting essentially of monomers of formula (I), said first graft copolymer comprising a plurality of sections, at least one of said sections comprising monomers of at least one alkyl acrylate and at least said alkyl methacrylate, and each of said sections having a different monomer composition.

10. The process of claim 1, wherein:

said polymer system consists essentially of a second graft copolymer consisting essentially of monomers of said formula (I):

said second graft copolymer comprising three sections (A), (B), and (C);

said second (A) consisting essentially of about 80–100% of an alkyl (of 1–8 carbons) acrylate monomer or monomers and about 0–20% of an alkyl (of 1–12 carbons) methacrylate monomer or monomers, and being present in an amount of about 5–35% of said second graft copolymer;

said section (B) consisting essentially of about 10–60% of an alkyl (of 1–8 carbons) acrylate monomer or monomers, about 40–90% of an alkyl (of 1–4 carbons) methacrylate monomer or monomers, and about 0–20% of an alkyl (of 1–12 carbons) methacrylate monomer or monomers; and being present in an amount of about 1–70% of said second graft copolymer;

said section (C) consisting essentially of about 60–100% of an alkyl (of 1–4 carbons) methacrylate monomer or monomers and about 0–40% of an alkyl (of 1–12 carbons) methacrylate monomer or monomers, and being present in an amount of the remainder of said second graft copolymer.

11. The process of claim 1, wherein:

said polymer system consists essentially of a third graft copolymer consisting essentially of monomers of formula (I);

said third graft copolymer consisting essentially of four sections (A), (B), (C), and (D);

said section (A) consisting essentially of about 51–100 parts of an alkyl (of 1–4 carbons) methacrylate monomer or monomers, about 0–49 parts of an alkyl (of 1–8 carbons) acrylate monomer or monomers, about 0–10 parts of a polyfunctional monomer, and about 0.1–5 parts of a graftlinking agent, and being present in an amount of 5–35% of said third graft copolymer;

said section (B) consisting essentially of about 80–120 parts of an alkyl (of 1–8 carbons) acrylate monomer or monomers, about 0–10 parts of a polyfunctional monomer, and about 0.1–5 parts of a graftlinking agent, and being present in an amount of about 5–45% of said third graft copolymer;

said section (C) consisting essentially of about 10–90 parts of an alkyl (1–4 carbons) methacrylate monomer or monomers, about 90–100 parts of an alkyl (1–8 carbons) acrylate monomer or monomers, about 0.1–5 parts of a graftlinking agent, and about 0–10 parts of a polyfunctional monomer, and being present in an amount of about 5–35% of said third graft copolymer; and said section (D) consists essentially of about 50–100 parts of an alkyl (of 1–4 carbons) methacrylate monomer or monomers, and about 0–49 parts of an alkyl (1–8 carbons) acrylate monomer or monomers, and being present in an amount of about 10–80% of said third graft copolymer.

12. The process of claim 1, wherein:

said polymer system consists essentially of a first mixed copolymer consisting essentially of monomers of said formula (I);

said $R_2$ is straight or branched alkyl of about 1–8 carbon atoms;

said first mixed copolymer consisting essentially of about 10–60% of an alkyl acrylate monomer or monomers, and about 40–90% of an alkyl mwethacrylate monomer or monomers.

13. The process of claim 2, wherein:

said $R_2$ is straight or branched alkyl of about 1–4 carbon atoms;

said copolymer system consists essentially of a first mixed copolymer which consists essentially of about 30–50% of an alkyl acrylate monomer or monomers and about 50–70% of an alkyl methacrylate monomer or monomers;

said first mixed copolymer having a total elongation of about 150–210%, a tear resistance of about 6–10 g/mil (about 236–394 mg/micron), a tensile strength of about 4800–5200 lbs/in$^2$ (about 338–366 kg/cm$^2$), a molecular weight of about 300,000–400,000 amu, an acid content of about 0.1–2.0, and a Tucon hardness of about 7–11 Knoop Nos.;

said film consists essentially of about 98–99.9% of said polymer system and about 0.1–2.0% of said residual organic solvent;

and said film has a dimensional stability of about 0–2%, and a thickness of about 0.75–3.0 mils (about 19–76 microns).

14. The process of claim 5, wherein:
said polymer system consists essentially of a first mixed copolymer which consists essentially of about 35-45% of a single alkyl acrylate monomer of formula (I), and about 55-65% of a single alkyl methacrylate monomer of formula (I);
said $R_2$ is alkyl of about 1-2 carbon atoms;
said total elongation (a) is about 170-190%;
said tear resistance (b) is about 8-9 g/mil (about 315-354 mg/micron);
said tensile strength (c) is about 4900-5100 lbs/in$^2$ (about 345-359 kg/cm$^2$);
said molecular weight (d) is about 325,000-375,000 amu;
said acid content (e) is about 0.1-0.9%;
said Tucon hardness (f) is about 8-10 Knoop Nos.;
said film having each of the aforesaid properties (a) through (c) and (e) through (g), having a thickness of about 1.0-2.5 mils (about 25-63 microns), having a dimensional stability of about 0.1-1.0%; and
said film consisting essentially of about 0.1-1.0% of said residual organic solvent and about 99.0-99.9% of said polymer system.

15. The process of claim 1, wherein:
said polymer system further consists essentially of about 1-50% of a second polymer;
said second polymer consisting essentially of monomer units of formula (I), and having the following properties: a total elongation of about 3-7%; a tensile strength of about 8,000-10,000 lbs/in$^2$ (about 563-704 kg/cm$^2$); a tear resistance of about 4-6 g/mil (about 157-236 mg/micron); a molecular weight of about 90,000-120,000 amu; an acid content of about 0.0-5.0%; and a Tucon hardness of about 12-22 Knoop Nos.;
and said second polymer is completely miscible in all compatible polymers of said polymer system when dissolved in said organic solvent.

16. The process of claim 10, wherein:
said polymer system further consists essentially of about 1-50% of a second polymer;
said second polymer consisting essentially of monomer units of formula (I), and having the following properties: a total elongation of about 3-7%; a tensile strength of about 8,000-10,000 lbs/in$^2$ (about 563-704 kg/cm$^2$); a tear resistance of about 4-6 g/mil (about 157-236 mg/micron); a molecular weight of about 90,000-120,000 amu; an acid content of about 0.0-5.0%; and a Tucon hardness of about 12-22 Knoop Nos.;
and said second polymer is completely miscible in all compatible polymers of said polymer system when dissolved in said organic solvent.

17. The process of claim 11, wherein:
said polymer system further consists essentially of about 1-50% of a second polymer;
said second polymer consisting essentially of monomer units of formula (I), and having the following properties: a total elongation of about 3-7%; a tensile strength of about 8,000-10,000 lbs/in$^2$ (about 563-704 kg/cm$^2$); a tear resistance of about 4-6 g/mil (about 157-236 mg/micron); a molecular weight of about 90,000-120,000 amu; an acid content of about 0.05-5.0%, and a Tucon hardness of about 12-22 Knoop Nos.;
said second polymer is completely miscible in all compatible polymers of said polymer system when dissolved in said organic solvent.

18. The process of claim 12, wherein:
said polymer system further consists essentially of about 1-30% of a second polymer;
said second polymer consisting essentially of monomer units of formula (I) and having the following properties: a total elongation of about 3-7%; a tensile strength of about 8,000-10,000 lbs/in$^2$ (about 563-704 kg/cm$^2$); a tear resistance of about 4-6 g mil (about 157-236 mg/micron); a molecular weight of about 100,000-110,000 amu; an acid content of about 0.0-2.0%; and a Tucon hardness of about 15-19 Knoop Nos.;
said second polymer is completely miscible in all compatible polymers of said polymer system when dissolved in said organic solvent;
said second polymer consists essentially of about 3-10% of said alkyl acrylate monomer or monomers of formula (I) and about 90-97% of said alkyl methacrylate monomer or monomers of formula (I).

19. The process of claim 13, wherein:
said polymer system further consists essentially of about 5-20% of a second polymer;
said second polymer consisting essentially of monomer units of formula (I), and having the following properties: a total elongation of about 3-7%; a tensile strength of about 8,000-10,000 lbs/in$^2$ (about 563-704 kg/cm$^2$); a tear resistance of about 4-6 g/mil (about 157-236 mg/micron); a molecular weight of about 100,000-110,000 amu; an acid content of about 0.1-0.9%; and a Tucon hardness of about 15-19 Knoop Nos.;
and said second polymer is completely miscible in all compatible polymers of said polymer system when dissolved in said organic solvent;
and said second polymer consists essentially of about 3-10% of said alkyl acrylate monomer or monomers of formula (I) and about 90-97% of said alkyl methacrylate monomer or monomers of formula (I).

20. The process of claim 14, wherein:
said polymer system further consists essentially of about 8-12% of a second polymer;
said second polymer consisting essentially of monomer units of formula (I), and having the following properties: a total elongation of about 3-7%; a tensile strength of about 8,000-10,000 lbs/in$^2$ (about 563-704 kg/cm$^2$); a tear resistance of about 4-6 g/mil (about 157-236 mg/micron); a molecular weight of about 104,000-106,000 amu; an acid content of about 0.1-0.9%; and a Tucon hardness of about 15-19 Knoop Nos.;
said second polymer is completely miscible in all compatible polymers of said polymer system when dissolved in said organic solvent;
and said second polymer consists essentially of about 3-10% of said alkyl acrylate monomer of formual (I) and about 90-97% of said alkyl methacrylate monomer of formula (I).

* * * * *